United States Patent [19]

Berry

[11] 4,227,838
[45] Oct. 14, 1980

[54] GROOVING AND CUT-OFF TOOL

[75] Inventor: Robert W. Berry, Hazel Park, Mich.

[73] Assignee: Fansteel Inc., North Chicago, Ill.

[21] Appl. No.: 1,683

[22] Filed: Jan. 8, 1979

[51] Int. Cl.³ ............................................. B26D 1/12
[52] U.S. Cl. .................................... 407/77; 407/101; 407/107; 407/117
[58] Field of Search .................... 407/77, 85, 88, 91, 407/99, 101, 103, 104, 107, 109, 117

[56] References Cited

U.S. PATENT DOCUMENTS

| Re. 25,955 | 2/1966 | Emmons | 407/117 |
|---|---|---|---|
| 2,293,006 | 8/1942 | Luers | 407/117 |
| 2,598,581 | 5/1952 | McKenna et al. | 407/104 |
| 3,152,386 | 10/1964 | Robbin | 407/117 |
| 3,171,188 | 3/1965 | Stier | 407/104 |
| 3,205,558 | 9/1965 | Stier | 407/109 |
| 3,596,337 | 8/1971 | Arnold et al. | 407/117 |
| 3,758,927 | 9/1973 | Stein | 407/85 |
| 3,780,408 | 12/1973 | McCreery | 407/117 |
| 4,051,584 | 10/1977 | Huser | 407/117 |
| 4,118,138 | 10/1978 | Takacs et al. | 407/117 |

OTHER PUBLICATIONS

Utilis Mullheim AG/SA Tool Catalog for Cut-Off Tools Autumn of 1979.

Primary Examiner—Harrison L. Hinson
Attorney, Agent, or Firm—Barnes, Kisselle, Raisch & Choate

[57] ABSTRACT

The invention relates to a cutting tool especially useful for cut-off, threading and grooving operations. The tool includes a massive block-like body with serrations along one or both sides. An adjustable plate with interengaging complemental serrations is mounted on the side of the body and retained by bolts which transfix the plate and anchor in the body. The plate has a top recess to receive short cutting elements backed up by a similarly shaped rod. A broached out-of-round hole is cut into the body parallel to the serrated wall to receive at one end a threaded anchor nut and at the other end a shank of a clamp bar.

2 Claims, 18 Drawing Figures

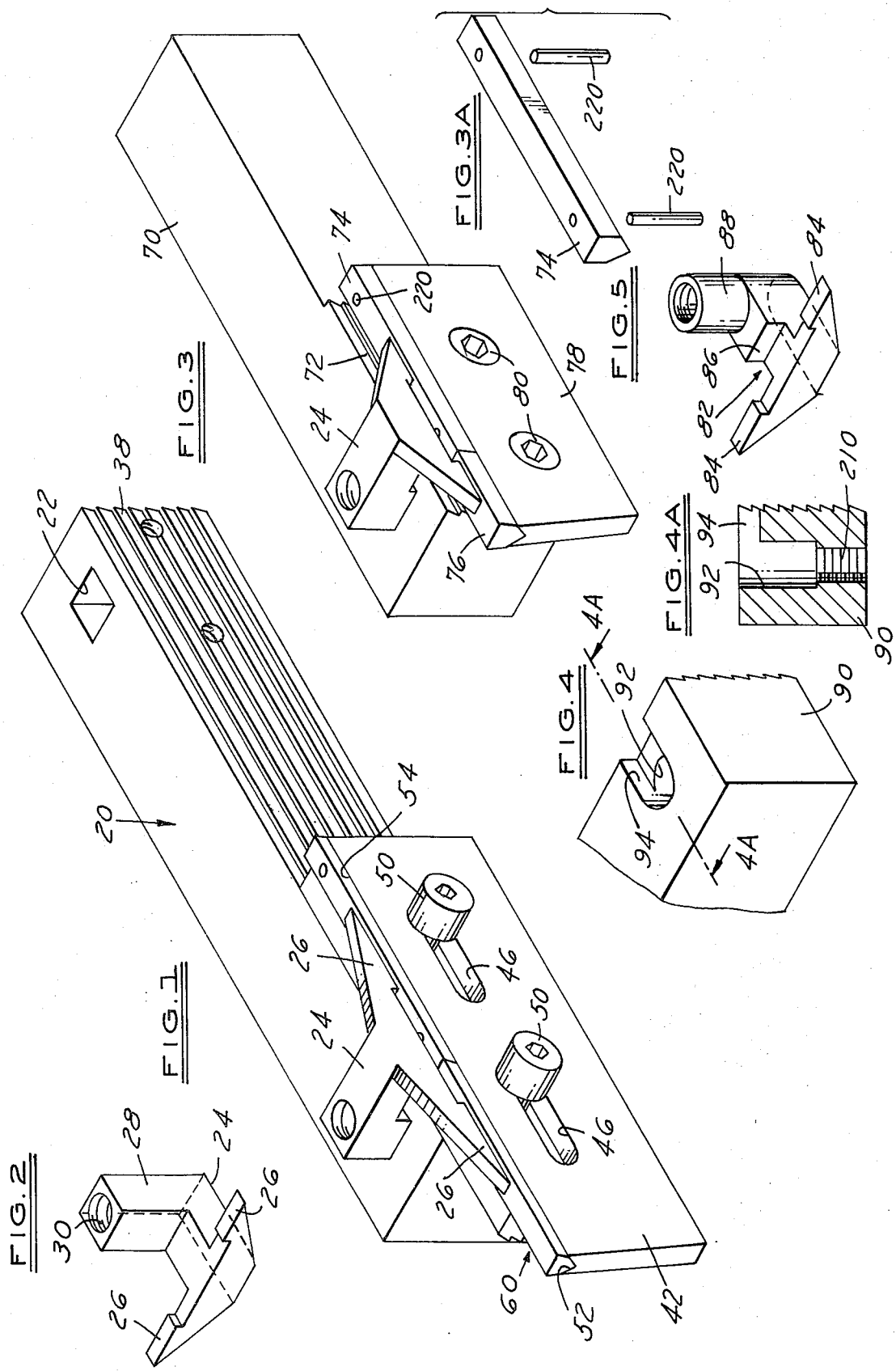

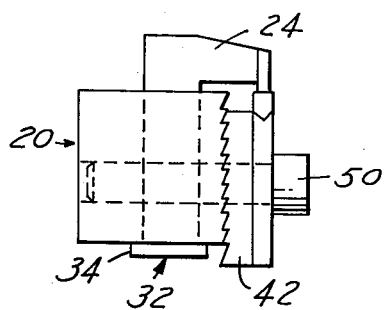
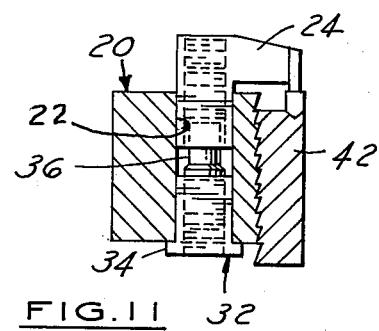
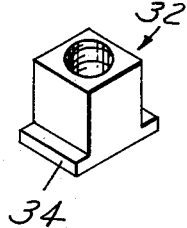
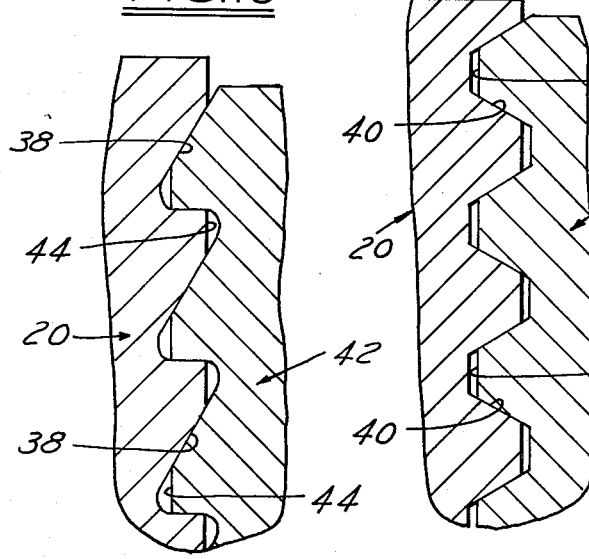
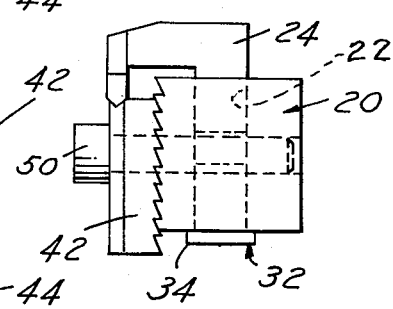
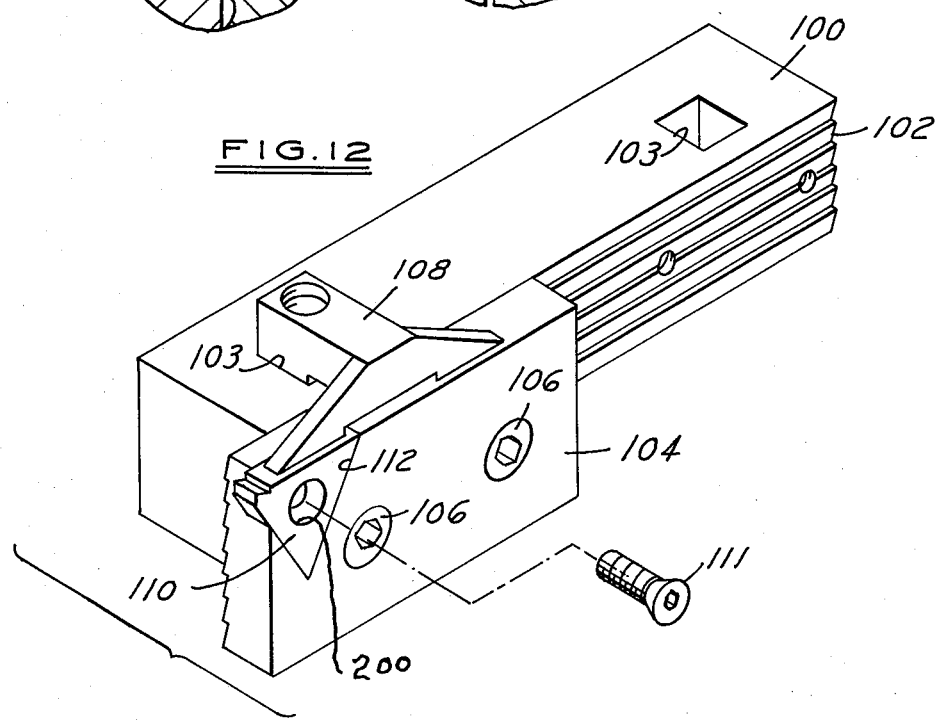

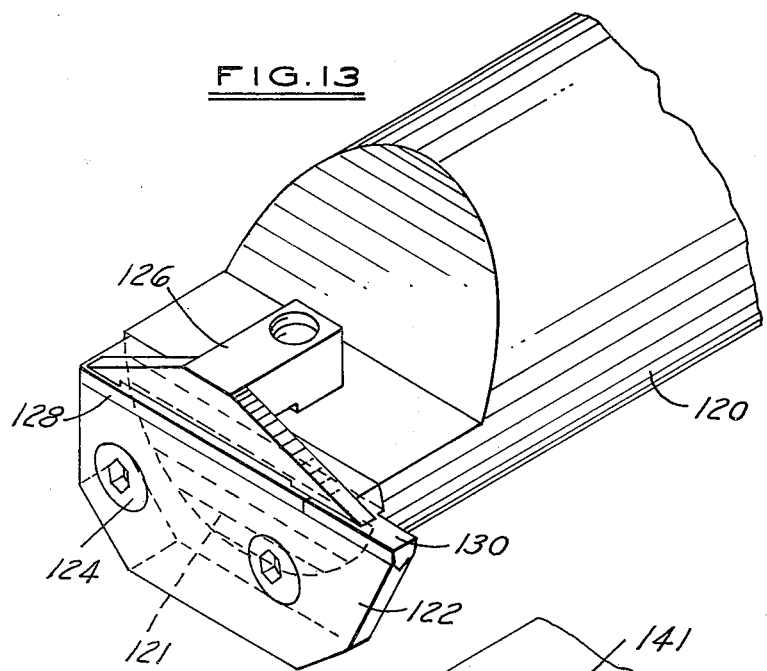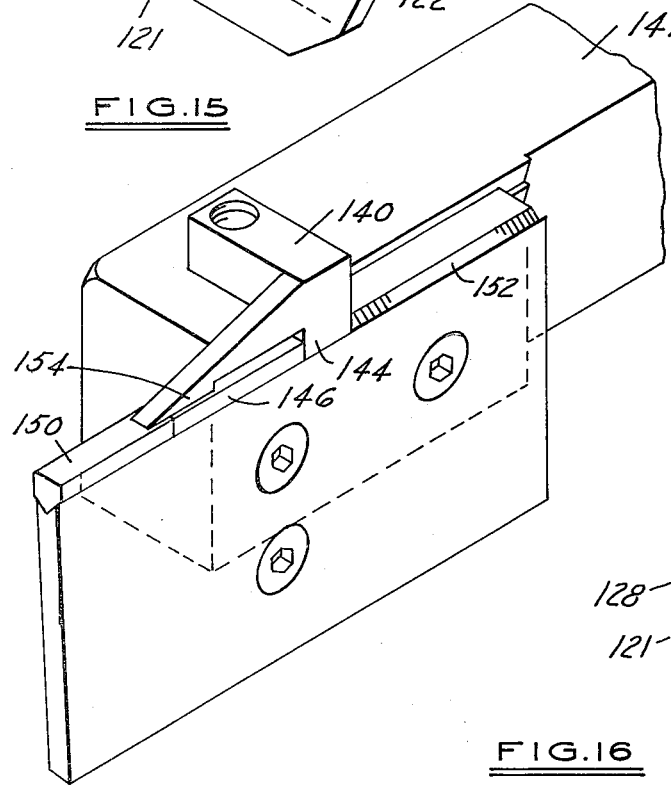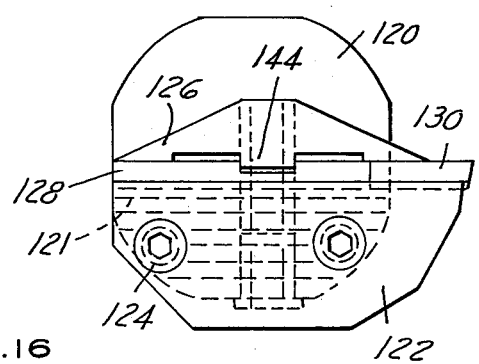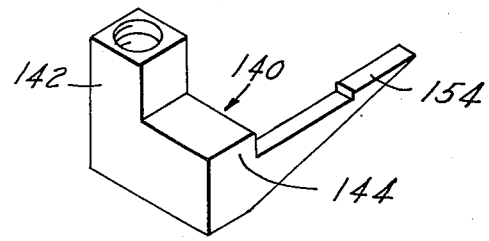

GROOVING AND CUT-OFF TOOL

FIELD OF INVENTION

Tool holders for narrow replaceable and adjustable blades used in cut-off, threading and grooving operations.

BACKGROUND OF INVENTION

Cutting tools which utilize a small and narrow hard metal insert are used for cutting off round bars which are turned while in contact with the insert. Other uses include external threading of bars, and grooving. Because of the narrow tool used in these operations and the circumstance that the tool must project outwardly a considerable distance, and the need for relatively high load pressure on the tool, the problem of holding the insert has been the subject of many patents.

Exemplary United States patents in this field are as follows:

3,688,366 Sept. 5, 1972 Jones
3,693,224 Sept. 26, 1972 Bartoszevicz
3,846,882 Nov. 12, 1974 Stein
4,011,050 Mar. 8, 1977 Zinner The tools which utilize bolted side plates will frequently fail in use because of the heavy down load. The bolts will shear and even a supporting shelf under the side plate will give way. Furthermore, the tools sometimes need to be used for left-hand cutting, i.e., the insert on the left side, and sometimes for right-hand cutting. It is further advantageous to be able to adjust the cutting insert longitudinally of the tool body for various applications.

It is an object of the present invention to provide a cut-off tool which has the needed strength to withstand heavy down loads and which also permits right or left-hand use and vertical and longitudinal adjustment all in the same tool body.

Other objects and features of the invention will be apparent in the following description and claims in which the principles of the invention are set forth in connection with the best mode presently contemplated together with details to enable a person skilled in the art to practice the invention.

BRIEF DESCRIPTION OF THE DRAWINGS

FIG. 1, a perspective view of a tool assembly embodying the present invention.

FIG. 2, a view of the insert clamp used in FIG. 1.

FIG. 3, a modified structure with a short serrated area.

FIG. 3A, a view of an insert back-up shaft and holding pins.

FIG. 4, a view of a modified tool body to receive a modified clamp.

FIG. 4A, a sectional view on line 4A—4A of FIG. 4.

FIG. 5, a bottom view of a modified clamp to be used with the modification of FIG. 4.

FIG. 6, an end view of the assembly of FIG. 1.

FIG. 7, a sectional view of the FIG. 1 structure showing the clamping structure.

FIG. 8, a perspective view of a clamp screw anchor nut.

FIG. 9, an end view of a structure like that of FIG. 1 using an opposite hand set up.

FIG. 10, a sectional view of groove serrations of the saw tooth type.

FIG. 11, a sectional view of a modified acme thread type serration.

FIG. 12, a view of the invention utilizing a triangular indexable insert.

FIG. 13, a view of the adaptation of the invention to a shaft end for use as a boring bar.

FIG. 14, an end view of the FIG. 13 assembly.

FIG. 15, a view of a single end clamp with a back-up shoulder for an insert.

FIG. 16, a bottom view of the modified clamp of FIG. 15.

DETAILED DESCRIPTION OF THE EMBODIMENTS OF THE DRAWINGS

With reference to the drawings, in FIG. 1, a tool bar or shank 20 is shown of elongate rectangular form with dimensions from 4 to 8 inches in length, generally 1 to 1½ inches in height, and 1 inch in width. Any suitable steel can be used for this shank. Through the end of the shank from top to bottom, a hole is drilled and broached to a square cross-section 22. This hole is shown at the right-hand end of the shank and is covered by a clamp 24 at the left-hand end.

The clamp 24 has a rectangular body with wings 26 extending transversely at one end. See FIG. 2. At the other end a square dependent plug 28 projects downwardly into the hole 22. This plug has a core hole 30 threaded to receive one end of a clamp screw. At the other end of hole 22 is a clamp nut 32 having a square plug section to fit in hole 22 and a stop flange 34. See FIGS. 6, 7 and 8. The hole in the nut is threaded with the opposite hand thread from the clamp. A double ended clamp screw 36 has one end threaded into the clamp and the other into the nut. The nut preferably has a snug fit with hole 22 so that it serves as a base for the raising and lowering of the clamp 24, but it may also be removed as will be later explained.

The side of the tool bar is formed with grooves 38 extending in parallel relation the length of the bar and having a saw-tooth configuration as shown in FIG. 10 with the horizontal step at the bottom or a symmetrical acme thread configuration 40 as shown in FIG. 11.

An insert carrier plate 42 has an inner face which is provided with grooves complemental to those on the tool shank with the exception that the crests of the serrations on the bar 20 and the plate 42 are truncated at 44 to insure that the sides of the serrations will seat fully into contact along each serration. The carrier plate is provided with retainer holes or slots 46 and is held in place by headed bolts 50.

The top edge of the carrier plate 42 is provided with a V-groove 52 which receives an insert backup shaft 54 held in place by the rear wing 26 of clamp 24 and vertical locating pins 220 through 54 and into 42. Cutting insert 60 backs up against shaft 54.

In FIGS. 6 and 7, end and sectional views of the bar of FIG. 1 are shown in connection with the retainer nut 32 and double-ended screw 36 previously described relative to FIG. 1.

Because of the multiple holding surfaces provided by the gooves on the side of the bar, the bar can be smaller in thickness and in depth since no ledge need be formed below the carrier plate. In addition, the carrier plate can be made thicker while still maintaining the needed overall side dimension.

In FIG. 3, the invention is illustrated in connection with a bar 70 which has a serrated section 72 at one end. Clamp 24 is utilized to clamp back-up shaft 74 and a corresponding cutting insert 76 on carrier plate 78. Recessed headed screws 80 hold plate 78 against the bar 70.

In FIGS. 4 and 5, a modified clamp construction is shown in which the body 82 of the clamp has wings 84 and a lug 86 in front of a cylindrical plug projection 88. A bar 90 has a round recess 92 to receive the clamp and double ended screw and a side slot 94 to receive lug 86 which will effect an interengagement to prevent turning of the clamp. In FIG. 4A, an embodiment shows the use of a tapped hole 210 in the tool holder shank so that a holding screw threads directly into the tapped hole, thus eliminating the square nut shown in FIG. 8.

FIGS. 1, 3, 6 and 7 show embodiments in which the carrier plate is on one side of the bar. In FIG. 9, the bar 20 is used with the carrier plate 42 at the other end and the clamp 24 moved to the other hole 22. Thus, a single tool bar can be used for right-hand or left-hand application. The retainer nut 32 can easily be knocked out of one hole and plugged into the clamp screw opening at the other end. This illustrates the versatility of the serrated design. The use of symmetrical acme threads, as illustrated in FIG. 11, allows the plates to be inverted at will.

In FIG. 12, a bar 100 has saw-tooth serrations 102 with clamp holes 103 and a carrier plate 104 held in place by bolts 106. A double wing clamp 108 holds a triangular cut-off insert 110 in a complemental recess 112. A screw or pin 111 through hole 200 may also be used with or without clamp 108 to stabilize the insert for some applications.

In FIGS. 13 and 14, the principles of the invention are applied to a boring bar 120 which has a notched end with serrations 121 on the un-notched portion. A carrier plate 122 is similarly serrated and held in place with countersunk screws 124. A double wing clamp 126 similar to clamp 26 as shown in FIG. 1, is used to hold an insert back-up rod 128 and the cutting insert 130 in the V-notch on top of the plate.

In FIGS. 15 and 16, a single wing clamp 140 is shown on bar 141 with a square depending plug portion 142 and a shoulder 144 which serves as a back-up for an anvil rod 146 behind insert 150 seated in groove 152. The shoulder 144 extends downwardly below the pad 154 on the clamp wing as shown in the drawings.

What I claim is:

1. A cutting tool for holding relatively small replaceable inserts which comprises:
   (a) a tool body to be held in a machine adjacent a workpiece having a flat face formed with parallel, elongate serrations,
   (b) a holding plate on said body having serrations on one surface complemental to those on said body and having an exposed recess to receive a cutting insert,
   (c) means on said body to retain said plate securely against said body in one of a plurality of adjusted positions,
   (d) clamping means on said body shaped to overlie said exposed recess to clamp an insert in said recess,
   (e) said clamping means comprising a portion to overlie said recess and a threaded portion received in one end of a recess in said body, a threaded insert in the other end of said body recess, and a double-threaded screw received in said threaded insert and said threaded portion to move said clamp toward and away from said body, and
   (f) said threaded insert in the other end of said body recess comprising a block having an out-of-round portion to be received in said recess and a portion to seat against said body.

2. A cutting tool for holding relatively small replaceable inserts which comprises:
   (a) an elongate tool body to be held in a machine adjacent a workpiece having a flat face terminating at parallel top and bottom walls, said face being formed with parallel, elongate serrations extending lengthwise of the body from the top to the bottom walls,
   (b) a holding plate on said body having serrations on one surface complemental to and interfitting with those on said body and having an exposed recess to receive a cutting insert,
   (c) means on said body to retain said plate securely against said body in one of a plurality of longitudinally adjusted positions,
   (d) clamping means on said body having a portion to overlie said exposed recess to clamp and insert in said recess, and
   (e) said tool body having a recess at each end spaced from said flat face and extending between said top and bottom walls which are disposed at right angles to said serrated surface, and said clamping means having a projecting portion complemental to and insertable in each of said body recesses from either the top or bottom walls.

* * * * *